US009774569B2

(12) United States Patent
Fossen et al.

(10) Patent No.: US 9,774,569 B2
(45) Date of Patent: Sep. 26, 2017

(54) DETECTION OF UNDESIRED COMPUTER FILES USING DIGITAL CERTIFICATES

(71) Applicant: Fortinet, Inc., Sunnyvale, CA (US)

(72) Inventors: Steven Michael Fossen, Coquitlam (CA); Alexander Douglas MacDonald, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/456,505

(22) Filed: Mar. 11, 2017

(65) Prior Publication Data
US 2017/0187684 A1    Jun. 29, 2017

Related U.S. Application Data

(63) Continuation of application No. 11/958,196, filed on Dec. 17, 2007.

(60) Provisional application No. 60/870,405, filed on Dec. 17, 2006.

(51) Int. Cl.
*G06F 21/56* (2013.01)
*H04L 29/06* (2006.01)
*H04L 12/58* (2006.01)

(52) U.S. Cl.
CPC ........ *H04L 63/0254* (2013.01); *G06F 21/562* (2013.01); *H04L 51/08* (2013.01); *H04L 51/22* (2013.01); *H04L 63/0281* (2013.01); *H04L 63/0823* (2013.01); *H04L 63/105* (2013.01); *H04L 63/145* (2013.01); *H04L 63/1416* (2013.01)

(58) Field of Classification Search
None
See application file for complete search history.

(56) References Cited

U.S. PATENT DOCUMENTS

| 5,903,651 | A  | 5/1999  | Kocher        |
|-----------|----|---------|---------------|
| 6,516,337 | B1 | 2/2003  | Tripp et al.  |
| 6,611,925 | B1 | 8/2003  | Spear         |
| 6,675,205 | B2 | 1/2004  | Meadway et al.|
| 6,851,057 | B1 | 2/2005  | Nachenberg    |
| 6,976,271 | B1 | 12/2005 | Le Pennec     |

(Continued)

OTHER PUBLICATIONS

Final Rejection for U.S. Appl. No. 11/958,196 mailed Sep. 16, 2011.
(Continued)

*Primary Examiner* — Michael R Vaughan
(74) *Attorney, Agent, or Firm* — Hamilton, DeSanctis & Cha LLP

(57) ABSTRACT

Methods and systems for detecting undesirable computer files based on scanning and analysis of information contained within an associated digital certificate chain are provided. According to one embodiment, a file having associated therewith a certificate chain is received. A type and structure of the file are identified. A location of the certificate chain is determined based on the identified type and structure. A signature of the file is formed by extracting a targeted subset of information from the certificate chain. The file is evaluated by comparing the signature with a set signatures having a known desirable or undesirable status. The file is classified based on a result of the evaluating into a category of multiple categories, including one indicative of an associated file being an undesired file or a file suspected of being undesired. The file is handled in accordance with a policy associated with the category.

20 Claims, 5 Drawing Sheets

(56) References Cited

U.S. PATENT DOCUMENTS

| | | |
|---|---|---|
| 7,055,175 B1 | 5/2006 | Le Pennec |
| 7,099,916 B1 | 8/2006 | Hericourt |
| 7,305,558 B1 | 12/2007 | Miyazaki et al. |
| 7,359,871 B1 | 4/2008 | Paasche |
| 7,590,844 B1 | 9/2009 | Sherman et al. |
| 8,132,245 B2 | 3/2012 | von Schlegell |
| 2001/0020272 A1 | 9/2001 | Le Pennec |
| 2002/0016925 A1 | 2/2002 | Le Pennec |
| 2003/0177397 A1 | 9/2003 | Samman |
| 2003/0206643 A1 | 11/2003 | Sansone |
| 2004/0064335 A1 | 4/2004 | Yang |
| 2004/0153644 A1 | 8/2004 | McCorkendale et al. |
| 2005/0120242 A1 | 6/2005 | Mayer |
| 2005/0257045 A1 | 11/2005 | Bushman et al. |
| 2006/0015746 A1 | 1/2006 | Kusudo et al. |
| 2007/0266254 A1 | 11/2007 | von Schlegell |
| 2008/0109871 A1 | 5/2008 | Jacobs |
| 2008/0155691 A1 | 6/2008 | Fossen et al. |
| 2012/0066346 A1 | 3/2012 | Virmani et al. |
| 2015/0295937 A1 | 10/2015 | Fossen et al. |

OTHER PUBLICATIONS

Non-Final Rejection for U.S. Appl. No. 11/958,196 mailed Dec. 23, 2010.
Examiner's Answer to Appeal Brief for U.S. Appl. No. 11/958,196 mailed Aug. 16, 2012.
Non-Final Rejection for U.S. Appl. No. 11/958,196 mailed Oct. 2, 2015.
Final Rejection for U.S. Appl. No. 11/958,196 mailed Aug. 8, 2016.
Notice of Allowance for U.S. Appl. No. 14/670,235 mailed Jan. 13, 2017.
Non-Final Rejection or U.S. Appl. No. 14/670,235 mailed Apr. 29, 2016.

DETECTION OF UNDESIRED COMPUTER FILES USING DIGITAL CERTIFICATES

CROSS-REFERENCE TO RELATED APPLICATIONS

This application is a continuation of U.S. patent application Ser. No. 11/958,196, filed Dec. 17, 2007, which claims the benefit of priority to U.S. Provisional Patent Application No. 60/870,405, filed on Dec. 17, 2006, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006-2015, Fortinet, Inc.

BACKGROUND

Field

Embodiments of the present invention generally relate to the field of computer virus and malware detection and prevention within computer systems having methods for the detection of and protection from malicious and undesired computer files. In particular, various embodiments relate to detecting malicious and undesired computer files sent through the internet by tracking, examining, and comparing the digital certificates that accompany sent files.

Description of the Related Art

Digital certificates attempt to address problems associated with whether or not to trust computer software, such as software that arrives from the Internet and is sometimes run or executed immediately. A digital certificate can be obtained by a software distributor from a certificate authority and attached to a file or program by the software distributor. The software distributor only needs to provide proof of identity to the certificate authority when obtaining the certificate. No attempt is made by the certificate authority to determine whether the distributor is trustworthy, or whether the files that will be distributed with the certificate can be used safely.

A program with an attached certificate is known as signed code. When signed code arrives on a computer, the user is typically presented with certificate information, by way of a dialog box, including the name of the distributor associated with the certificate. The user is given a choice. The signed code can be trusted and allowed to execute, or it can be rejected. However, the user has no good way to make this decision, except in rare cases where the distributor's name and reputation are familiar. Consequently, the use of code signing does little to protect computer users from undesirable and often harmful software. Worse yet, the presence of a certificate suggests to users that a program can be trusted, so that they may decide to execute and run a program that they would have rejected if it were not signed.

SUMMARY

Methods and systems are described for detecting undesirable computer files based on scanning and analysis of information contained within an associated digital certificate chain. According to one embodiment, a file having associated therewith a certificate chain is received by an antivirus detection module running on a network gateway device logically interposed between an external network and multiple host systems within a private network. A type and structure of the file are identified. A location of the certificate chain with respect to the file is determined based on the identified type and structure. A signature of the file is formed by extracting a targeted subset of information from the certificate chain based on the type and structure of the file. The file is evaluated by comparing the signature with a set signatures having a known desirable or undesirable status. The file is classified based on a result of the evaluating into a category of multiple categories, including one indicative of an associated file being an undesired file or a file suspected of being undesired. The file is handled in accordance with a policy associated with the category.

In one embodiment, the type and structure of a computer file are identified. A determination is made regarding whether there is certificate chain associated with the computer file. If so, the digital certificate chain is located and the entire certificate chain or specific identification information from the certificate chain is extracted. Then, the extracted information is examined to determine if the file is undesirable and therefore an unwanted file. Unwanted files may be prevented from being opened.

Some embodiments of the present invention, not only prevent unwanted files from being opened, but also prevent unwanted files arriving from the Internet from being saved within computer systems' main memory hierarchies. Hence, for some implementations of the present invention, a memory buffer is utilized as somewhere for arriving files to be held temporarily. In these cases, data from arriving files, after transit across a network, can be assembled and exist outside of a computer's main memory hierarchy being temporarily held in such a memory buffer. A memory buffer comprises some other medium than the main computer memory. Once a file is held temporarily in a memory buffer, it can then be evaluated according to embodiments of the present invention to detect if the file is undesirable or not. Undesirable files can be rejected, and then removed from the memory buffer without ever entering a computer's main memory hierarchy.

Still, other embodiments of the present invention do not require a memory buffer, and acceptable operation can occur so long as arriving code files are not immediately executed, but rather, digital certificate data of arriving code files are evaluated to detect for undesirable code files prior to running code from any arriving files. Undesirable files can later be removed (deleted), and while held in computer memory, all detected undesirable code files may be prevented from being run or executed.

Certificate chain data can be part of, and contained within, a single computer file, and therefore also sharing file space with other data or code bits. Or conversely, certificate chain data may possibly exist within separate files and these separate files having certificate chain data paired with and associated with other computer data or code files.

Once certificate chain data is located and extracted, some embodiments of the present invention focus attention and analysis on the "End Entity" certificate portion of the certificate chain in efforts to make identification of potentially harmful and likely unwanted files sent from undesirable and sometimes unscrupulous and possibly already identified problematic software distributors.

Other embodiments focus on extracting and analyzing from a certificate chain all or part of the data related to one or more of the following subject areas: the Certificate Serial Number; the Issuer Name; the Validity Information, the Subject Name, the Alternate Name, the Key Usage Information, and/or the Basic Constraint Information. The present invention should not be limited to analyzing only portions or combinations of these few mentioned subject areas of the certificate chain for the identification of unwanted files, but rather more generally, embodiments of the present invention may use targeted subsets of information extracted from the certificate chain according to an algorithm or by comparison to make identification of unwanted files.

Thus, comparison of specific portions of certificate chain data to identify it as identical to the codes or sequences associated with known undesired files is one way various embodiments of the present invention use certificate chain data to identify unwanted or undesirable computer files arriving from the Internet. Digital signature analysis is another mechanism to algorithmically examine one or more portions of certificate chain data and then compare the resultant digital signature with a set of known undesirable and/or a set of desirable resultant digital signatures to complete the determination analysis.

Some embodiments of the present invention, take an additional step of alerting or notifying a user and/or system administrator that an undesired computer file has been detected. According to one embodiment, a user or system administrator may be informed of all actions taken to prevent the file from being run, e.g., how the file was quarantined, and if the file has been removed, or if the file been stored somewhere in the main memory hierarchy or possibly in a temporary memory buffer can be useful information. In one embodiment, the use of log files to list all detected undesirable computer files, and also lists all actions taken, is an example of one way to alert or notify a user and/or a system administrator of the arrival of undesirable files when detected.

Alternative embodiments focus additionally on providing information to a user as to the degree of potential danger, or degree of suspicion, and/or other file characteristics and/or useful information extracted about a file from a certificate chain or otherwise. Some embodiments also further provide a user with an option to accept or reject arriving files. If rejected, some embodiments can allow for a user to select to quarantine a rejected file. Quarantined files are held in a memory buffer or otherwise, and remain dormant and are not permitted to be executed.

Other features of various embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
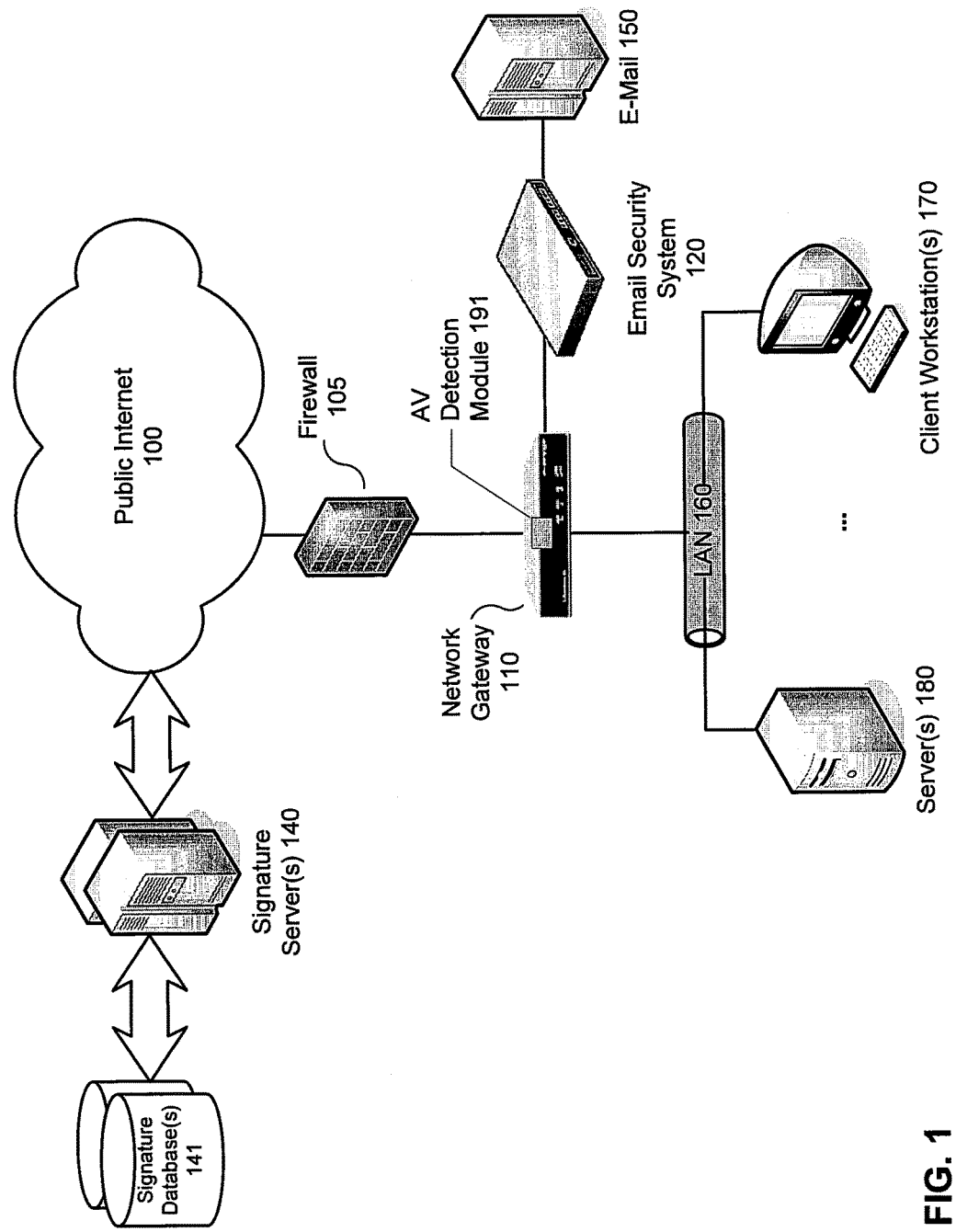
FIG. 1 is a block diagram conceptually illustrating a simplified network architecture in which embodiments of the present invention may be employed.

Methods and systems are described for detecting undesirable computer files based on scanning and analysis of information contained within an associated digital certificate chain. According to one embodiment undesired files are identified based on a comparison of (i) information within, characteristics of and/or a digital signature of digital certificates associated with the signed code with (ii) identifying information, characteristics and/or digital signatures obtained from digital certificate chains of known undesirable files. Digital certificates are used by various embodiments of the present invention to identify a true source of files and to facilitate detection of undesirable computer files by creating signatures based on data extracted from a certificate chain and comparing the signatures to signatures of known undesirable files. Generally, a recipient of code or data files should control use and/or access of such files entering their computer, and ultimately prevent from entering or remove any and all unwanted files. In particular, unwanted files entering computer systems containing executable code can be exceptionally devastating especially when unwanted code replaces existing executable code necessary for maintaining computer system operation as desired by user(s). For example, one possible extreme case happens when portions or all of operating system code are erroneously replaced resulting in unrecoverable and catastrophic total failure of a computer. However, and also of concern are, filtering schemes that do prevent undesirable files from entering and detrimentally impacting computer systems, but then erroneously do, and possibly unknown to the user, at other times then also overzealously wrongly prevent needed and desirable files from being received, for example, and not limited to, a desirable code update, or in possibly other cases, screen out or quarantine one or more email messages falsely identified as spam or as having an undesired attachment.

According to one embodiment, a goal is to block or quarantine digitally signed software in cases where the software originates from a known distributor of undesirable software. Detection can be for a specific certificate, characteristics or information associated with a certificate chain, digital signatures of certificates or certificate chains known to be associated with undesired files or for all signed code from a particular distributor or distributors. In one embodiment, in order to accomplish this, characteristics of and/or certain pieces of information contained within a digital certificate or certificate chain are identified/extracted, and compared to related information for certificates/chains that have been found to be associated with known undesired software. If a match is found, the software can be blocked or quarantined, and an alert may be issued to the user. In this case, the user would not be asked whether to trust the software. Alternatively, the user could be warned of the danger and allowed to decide whether to trust the software. Thus, the user can be protected from undesirable software, or given expert guidance when deciding whether to allow it to execute. By these and other means, various of the problems associated with the current use of digital certificates are avoided or at least alleviated.

In the following description, for the purposes of explanation, numerous specific details are set forth in order to provide a thorough understanding of embodiments of the present invention. It will be apparent, however, to one skilled in the art that various embodiments of the present invention may be practiced with or without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to simplified, representative examples of the type of data commonly found in end entity certificates, the present invention are also applicable to other forms of certificates.

Meanwhile, for sake of efficiency, embodiments of the present invention are described with reference to signed code. However, it should be noted that the methodologies described herein are also effective with any other type of file that can be signed with a digital certificate. An example would be "Cabinet" archive files.

Terminology

Brief definitions of terms, abbreviations, and phrases used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrase "content filtering" generally refers to performing monitoring or scanning of files and/or other data transfer between a client and a server, such as malware scanning, filename pattern blocking, confidential information control and the like.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

The term "proxy" generally refers to an intermediary device, program or agent, which acts as both a server and a client for the purpose of making or forwarding requests on behalf of other clients.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

The phrase "signed code" generally refers to an executable file that is digitally signed and/or transmitted along with a digital certificate from a certification authority (CA), such as VeriSign or Thawte. The digital certificate may be appended to the executable file or provided in a separate file.

Technology Overview

According to one embodiment of the present invention an anti-virus detection module is used to evaluate digital certificates distributed with software code. The detection can be for a specific certificate or for all signed code from the distributor.

In one embodiment, the system has two parts, a detection module and a signature generation module. The detection module may be used to check signed files on a host computer or in transit across a network. According to one embodiment, the detection process starts with a computer file, in some form, being presented to the detection module. The module first examines the file to determine whether it is a signed file, and then finds the location of the certificate within the file. This is accomplished by a method that depends on the type of file being examined.

With some files, for example Portable Executable (PE) files, the file header contains an offset or pointer to the certificate information. If this field is set, then a certificate is present, and the pointer can be used to locate the certificate.

With data or archive files, the certificate may be appended to the end of the file, without otherwise modifying the file. In these cases, the certificate can usually be located by checking the file header for information on the original length of the file.

Other methods of signing files exist, including the use of a separate file containing the certificate. Any of these can be handled by the module, simply by having it look in the appropriate location for the certificate. These examples are only presented as illustrations. The system is not limited to them, and can be used with any digitally signed computer file.

What the module has found, at this stage, is not an individual certificate, but a certificate chain, which may contain a number of certificates leading from a root authority to the end entity. The certificate chain typically includes from two to five individual certificates. Each of these certificates includes information about the "parent" certificate that it was issued under.

In a simple case, where the chain contains two certificates, one is the Certificate Authority's (CA) root certificate and the other is the certificate issued by the CA to the software distributor or end entity. For example:

Certificate Chain
    Certificate—End Entity
        Issuer—CA1 Root Department
        Subject—Software Distributor
    Certificate—CA Root
        Issuer—CA1 Root Department
        Subject—CA1 Root Department More complex certificate chains can include an intermediate CA, between the root and the end entity. Often they also include one or two time stamping certificates, used to deal with the problem of certificate expiration. The certificates may be presented in any order. Here is a typical example:

Certificate Chain
    Certificate—CA1 Root
        Issuer—CA1 Root Department
        Subject—CA1 Root Department
    Certificate—CA1 Signing
        Issuer—CA1 Root Department
        Subject—CA1 Signing Department
    Certificate—CA1 Time stamping
        Issuer—CA1 Root Time stamping
        Subject—CA2 Time stamping service
    Certificate—End Entity
        Issuer—CA1 Signing Department
        Subject—Software Distributor
    Certificate—CA2 Time stamping signer
        Issuer—CA2 Time stamping service
        Subject—CA2 Time stamping signer At this point, the detection module locates one or more certificates from which the detection information will be taken. In most cases, the information will be taken from the end entity certificate, the one actually issued to the software distributor. The certificates can appear in any order, so several indicators within each one will typically be examined to see if it is the correct one.

In one embodiment, once the end entity certificate has been located, selected information from it is compared to information contained in a set of signatures made based upon known undesirable files. The signatures look for different pieces of information according to the contents of the certificate they were made for.

Alternatively, the extracted information can be examined according to an algorithm to determine whether the file should be suspected of being undesirable. For example, lack of detailed information in the certificate data fields or an expiry date very far in the future might be sufficient cause for suspicion. In some embodiments, information associated with or based upon the digital certificate may be used as part of the detection algorithm. For example, the length of the certificate chain, the order of certificates, the presence or absence of certain information in various of the certificates, the presence or absence of time stamping certificates and hash value sizes, among other things may be used to influence whether a particular file should be suspected of being undesirable.

According to one embodiment, if a match is found between the information extracted from the one or more certificates of the signed code and the set of signatures, the software can be blocked or quarantined, and an alert issued to the user. In this case, the user would not be asked whether to trust the software, but may be warned that it has been blocked. Alternatively, the user could be warned of the danger, without the software being blocked and allowed to decide whether to trust the software.

The actual data contained in a certificate is somewhat variable. This is largely a result of vagueness in the standards leading to different interpretations. The software used by the distributor to sign the code can also influence the result.

The following is a simplified, representative example of the data in a common type of end entity certificate:

Version
Serial Number
Signature
Issuer Name (Distinguished Name structure)
    Country
    State/Province
    Locality
    Organization Name
    Organization Unit
    Common Name
Validity
    Not Before Time
    Not After Time
Subject Name (Distinguished Name structure)
    Country
    State/Province
    Locality
    Organization
    Organization Unit
    Common Name
Subject Public Key Info
Extensions
    Alternate Name
    Key Use Flags According to one embodiment, the signature generation module examines the certificate structure and determines which pieces of information should be used in the signature. Then, a replaceable component generates the signature in the required format.

The determination of which pieces of information should be used in the signature is complicated by several factors, some of which are listed below:

- The serial number is only unique to the CA that issued it. Another CA could issue the same serial number to a different software distributor;
- The Subject Organization Name should always be present, but can be very short, leading to questions about its uniqueness. At least one CA was willing to accept a three letter name in this field;
- The Subject Common Name is almost always set to be the same as the Organization Name, so that in most cases it is not very useful for identification;
- Subject Organization Unit often is empty or contains a generic text string that is not useful in identifying the software distributor; and
- Alternate Name usually contains the distributor's email address, which is a good piece of identification, but often it is empty or contains generic text.

In one embodiment, the signature generation module takes these factors, and others, into account when it creates the signature. The signature usually will be required to match several selected pieces of data from the certificate. The signature generation module examines each data item and determines its value for detection. In one embodiment, the signature is made from items selected to prevent false positives without unduly limiting detection.

In one embodiment, the signatures are made from known undesirable files, but since they are made for the certificate they are able to detect unknown undesirable files that originate from the same distributor. Because of this, users are not left unprotected each time a new version of the undesired software is released.

FIG. 1 is a block diagram conceptually illustrating a simplified network architecture in which embodiments of the present invention may be employed. In this simple example, client workstations 170 are coupled to the public Internet 100 via a local area network (LAN) 160, a network gateway 110 and a firewall 105. Also residing on the LAN 160 are one or more servers 180.

In the illustrated example, one or more remote signature servers 140 are coupled in communication with the firewall 105 via the public Internet 100. According to one embodiment, the firewall 105 incorporates various novel file scanning methodologies provided within an antivirus (AV) detection module 191 which are described further below. AV detection module 191 may perform scanning responsive to Internet content, such computer files containing computer software, program updates, etc., being retrieved by client workstations 170.

In the present example, the email security system 120 is also coupled to an email server 150 from which and through which client workstations 170 residing on the LAN 160 may retrieve and send email correspondence. In one embodiment, an AV detection module, such as AV detection module 191, may reside within email security system 120 and scan files attached to email correspondence.

In the exemplary network architecture of FIG. 1, the signature servers 140 are coupled in communication with one or more signature databases 141. The signature databases 141 store identification data or detection signatures, providing a high probability of identifying known malicious and/or undesired computer files, e.g., malware, adware, spyware, Trojans, computer viruses, problematic program code or data files and the like. Detection signatures may be generated for known undesired files directly from the file or from an archive containing the file. In one embodiment file properties found in the headers of various types of archives are used. For example, the file size and a hash function can be used if these are available within the headers of the archive file. In addition or alternatively, the archive header for the known undesired file may be located within the archive and selected data, e.g., one or more of a hash value of the contained undesired file, the size of the contained undesired file in compressed form and the size of the contained malware file in uncompressed form, from the header may be used to generate the detection signature. Various other sets of identification data may be used so long as the desired degree of certainty of correct identification is achieved.

According to one embodiment, the network gateway 110 periodically or responsive to a predetermined event, such as the existence of new signatures in the signature databases 141, updates a local stored copy of the signatures to allow file scanning to be performed locally. In alternative embodiment, files may be sent to the signature servers 140 for scanning.

According to one embodiment, the network gateway 110 intercepts file downloads or other communications between the client workstations 170 and the email server 150 having attached files and performs scanning of digital certificates associated with such files and potentially performs other traditional anti-virus detection and content filtering.

In alternative embodiments, the network gateway 110 may also check digital certificates associated with files residing on a hard drive of client workstations 170 and/or the one or more servers 180. While for convenience various embodiments of the present invention are described with reference to a novel AV module residing within a network gateway or an email security system, it is to be understood that the file and digital certificate scanning methodologies described herein may be performed by any network device having access to the content at issue. For example, the digital certificate scanning may be performed by one or more Internet and/or LAN accessible networked devices, such as one or more network gateways, firewalls, network security appliances, switches, bridges, routers, data storage devices, computer systems and the like, including but not limited to, firewall 105, email server 150, servers 180, or even client workstations 170.

Figure 2:
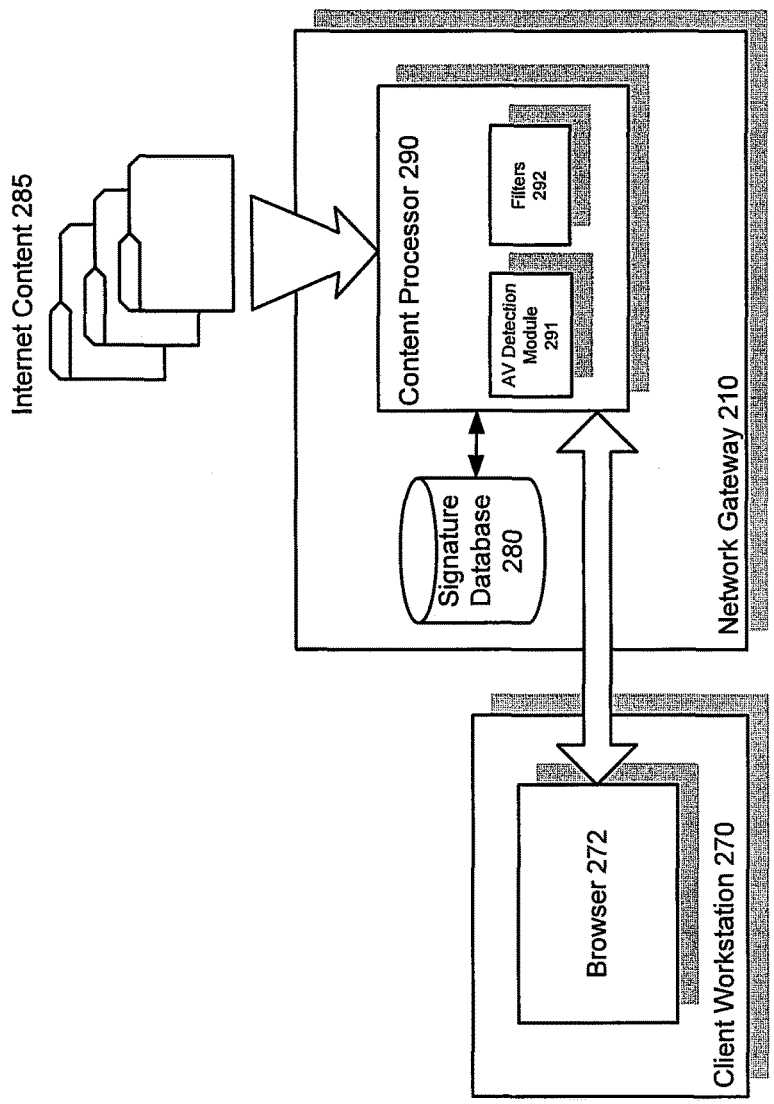
FIG. 2 is a block diagram conceptually illustrating interaction among various functional units of a network gateway and a client workstation in accordance with an embodiment of the present invention.

FIG. 2 is a block diagram conceptually illustrating interaction among various functional units of a network gateway 210 and a client workstation 270 in accordance with an embodiment of the present invention. While in this simplified example, only a single client application, i.e., browser 372, is shown interacting with content processor 290, it should be understood that files retrieved by various other types of client applications may be subject to the file scanning described herein. For example, virtually all operating systems and many software applications, such as Microsoft Office, Adobe Acrobat, Mozilla Firefox and even consumer applications like Intuit Quicken, McAfee VirusScan and McAfee Virex, now have built-in update capabilities. These update systems are typically configured to automatically download code updates from a web or file transfer protocol (FTP) server and then install the updates with or without human intervention. Unfortunately, many of such automated update systems have security vulnerabilities that allow an attacker to redirect the program performing the update to download their code instead, thereby providing an opportunity for a hacker to hijack the computer system being "updated."

According to the present example, a network gateway 210, which may be a virtual or physical device, includes a signature database 280 and a content processor 290. In one embodiment, all internet content 285 retrieved by browser 272 is subjected to scanning by the content processor 290. In other embodiments, filtering may be configurable based on the type, content and/or direction of flow of content. According to FIG. 2, in an attempt to protect client workstation 270 from malicious content, files attempted to be downloaded to the client workstation 270 are scanned by the content processor 390.

In the present example, the signature database 280 represents a local copy of all or a subset of detection signatures stored in signature databases 141. In one embodiment, the content processor 290, periodically queries the signature servers 140 to determine if the signature database 280 is up-to-date and if not requests a current set of detection signatures from the signature servers 140. Alternatively, the signature servers 140 may push updated detection signatures to the content processor 290.

According to present example, the content processor 290 is logically interposed between a client application, such as browser 272, and the public Internet 100. The Internet content 285 need not be stored locally on the network gateway 210 to support the digital certificate scanning functionality described herein. For example, the scanning process may open a direct connection between the source of the requested content and the browser 272 and filter files and/or associated digital certificates in real-time as the Internet content 285 passes through.

According to one embodiment, the content processor 290 performs scanning of digital certificates associated with files downloaded from the public Internet 100 and potentially performs other traditional anti-virus detection and/or content filtering on Internet content 285.

In one embodiment, the content processor 290 may proactively scan files stored on the client workstations 270 or the servers 180 by periodically initiating file scanning or may perform content filtering and file scanning responsive to external events (e.g., a request originating from software running on the client workstation 270 and/or a request originating from software running on the one or more servers 180).

In the current example, content processor 290 includes a novel antivirus (AV) detection module 291 and one or more other filters 292. The AV detection module 291 may apply current or future virus detection methodologies, such as signature matching, scanning, integrity checking, interception, heuristic detection and the like, to determine the presence of an undesired computer file in Internet content 285. According to the current example, the AV detection module 291, responsive to being presented with a file, determines whether the file has an associated digital certificate chain and if so, as described further below with reference to FIG. 5, determines if a signature associated with the digital certificate chain matches any of the detection signatures stored in the signature database 280.

In one embodiment, the content processor 290 is an integrated FortiASIC™ Content Processor chip developed by Fortinet, Inc. of Sunnyvale, Calif. In alternative embodiments, the content processor 290 may be a dedicated coprocessor or software to help offload content filtering tasks from a host processor.

While in the present example, the signature database 280 and the content processor 290 are all shown as residing within or as part of the same network device, in alternative embodiments one or more of the signature database 280 and the content processor 290 may be located remotely from the other functional units. According to one embodiment, the hardware components and/or software modules that implement the signature database 280 or the content processor 290 are generally provided on or distributed among one or more Internet and/or LAN accessible networked devices, such as one or more network gateways, firewalls, network security appliances, switches, bridges, routers, data storage devices, computer systems and the like. In one embodiment, the functionality of the separate functional units may be merged in various combinations. For example, the signature database 280 may be incorporated with the client workstation 270 or the content processor 290 or the content processor 290 may be incorporated within the client workstation 270.

Figure 3:
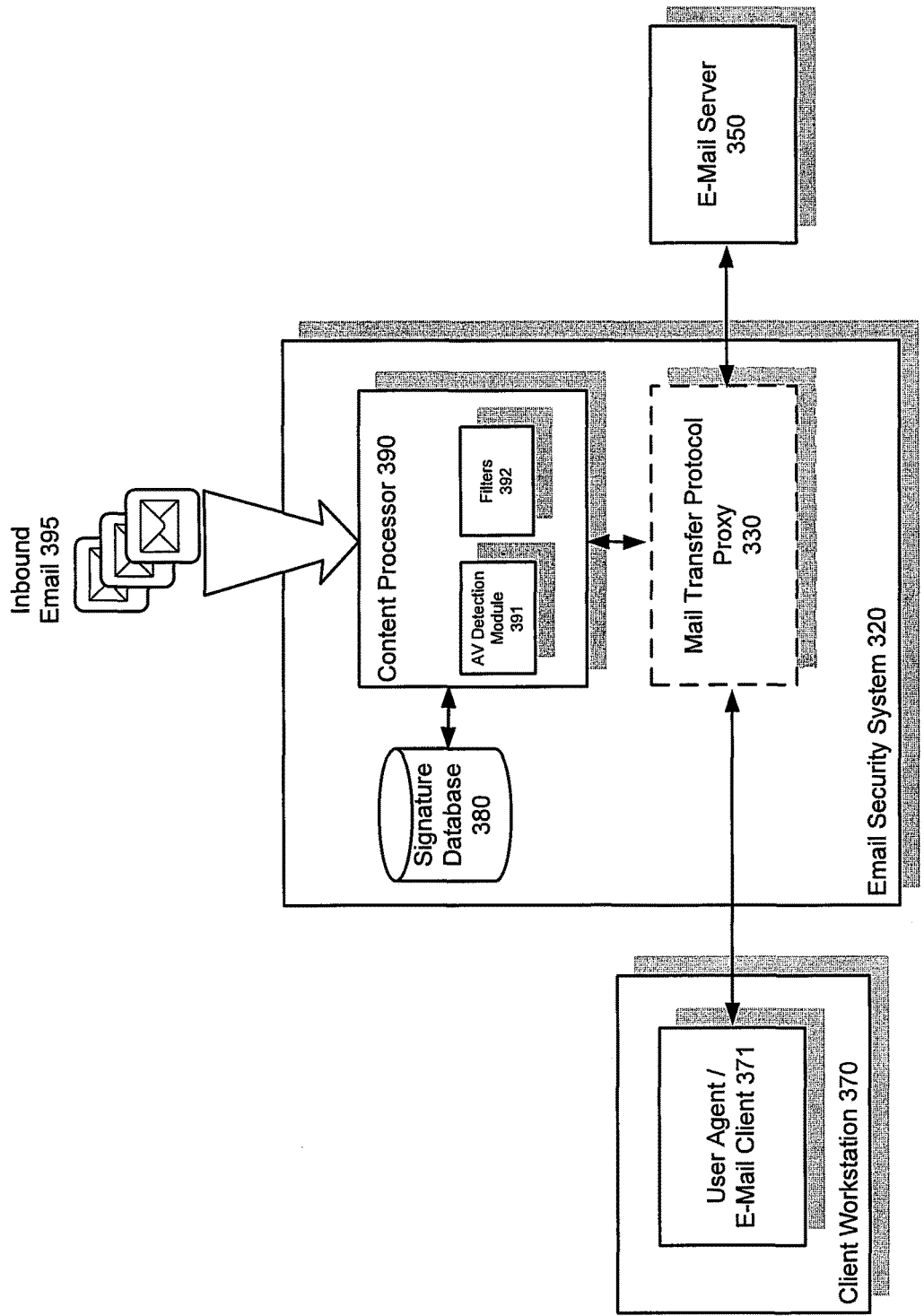
FIG. 3 is a block diagram conceptually illustrating interaction among various functional units of an email security system with a client workstation and an email server in accordance with an embodiment of the present invention.

FIG. 3 is a block diagram conceptually illustrating interaction among various functional units of an email security system 320 with a client workstation 370 and an email server 350 in accordance with an embodiment of the present invention.

While in this simplified example, only a single client workstation, i.e., client workstation 370, and a single e-mail server, i.e., e-mail server 350, are shown interacting with the email security system 320, it should be understood that many local and/or remote client workstations, servers and e-mail servers may interact directly or indirectly with the email security system 320 and directly or indirectly with each other.

According to the present example, the email security system 320, which may be a virtual or physical device, includes three high-level interacting functional units, a mail transfer protocol proxy 330, a signature database 380 and a content processor 390. In one embodiment, the mail transfer protocol proxy 330 is a transparent proxy that implements handlers for Simple Mail Transfer Protocol (SMTP) or Extended SMTP (ESMTP) commands/replies relevant to the performance of content filtering activities and passes through those not relevant to the performance of content filtering activities. In one embodiment, the mail transfer protocol proxy 330 subjects all email attachments to scanning by the content processor 390. In other embodiments, filtering may be configurable based on the type, content and/or direction of flow of the email. According to FIG. 3, in an attempt to protect client workstation 370 from malicious content, attachments associated with inbound email 395 are scanned by the content processor 390

In the present example, the signature database 380 represents a local copy of all or a subset of detection signatures stored in signature databases 141. In one embodiment, the content processor 390, periodically queries the signature servers 140 to determine if the signature database 380 is up-to-date and if not requests a current set of detection signatures from the signature servers 140. Alternatively, the signature servers 140 may push updated detection signatures to the content processor 390.

According to present example, the mail transfer protocol proxy 330 is logically interposed between a user agent or email client 371 executing on the client workstation 370 and the email server 350. Notably, neither the email messages nor there attachments need be stored locally on the email security system 320 to support the digital certificate scanning functionality described herein. For example, instead of the scanning process running responsive to a proxy, such as the mail transfer protocol proxy 330, the email security system 320 may open a direct connection between the email client 371 and the email server 350, and filter email file attachments and/or associated digital certificates in real-time as the email passes through.

According to one embodiment, the content processor 390 performs scanning of digital certificates associated with files attached to email messages transferred between the email client 371 and the email server 350 and potentially performs other traditional anti-virus detection and content filtering on data associated with the email messages.

In one embodiment, the content processor 390 may proactively scan files stored on the client workstations 370 or the servers 180 by periodically initiating file scanning or may perform content filtering and file scanning responsive to external events (e.g., a request originating from software running on the client workstation 370, a request originating from software running on the one or more servers 180 and/or by a request originating from the mail transfer protocol proxy 330).

In the current example, content processor 390 includes a novel antivirus (AV) detection module 391 and one or more other filters 392. The AV detection module 391 may apply current or future virus detection methodologies, such as signature matching, scanning, integrity checking, interception, heuristic detection and the like, to determine the presence of an undesired computer file. According to the current example, the AV detection module 391, responsive to being presented with a file, determines whether the file has an associated digital certificate chain and if so, as described further below with reference to FIG. 5, determines if a signature associated with the digital certificate chain matches any of the detection signatures stored in the signature database 380. The one or more other filters 392 may perform filename pattern blocking, confidential information control and the like.

In one embodiment, the content processor 390 is an integrated FortiASIC™ Content Processor chip developed by Fortinet, Inc. of Sunnyvale, Calif. In alternative embodiments, the content processor 390 may be a dedicated coprocessor or software to help offload content filtering tasks from a host processor.

While in the present example, the mail transfer protocol proxy 330, the signature database 380 and the content processor 390 are all shown as residing within or as part of the same network device, in alternative embodiments one or more of the mail transfer protocol proxy 330, the signature database 380 and the content processor 390 may be located remotely from the other functional units. According to one embodiment, the hardware components and/or software modules that implement the mail transfer protocol proxy 330, the signature database 380 and the content processor 390 are generally provided on or distributed among one or more Internet and/or LAN accessible networked devices, such as one or more network gateways, firewalls, network security appliances, switches, bridges, routers, data storage devices, computer systems and the like. In one embodiment, the functionality of the separate functional units may be merged in various combinations. For example, the signature database 380 may be incorporated with the mail transfer protocol proxy 330 or the mail transfer protocol proxy 330 may be incorporated within the content processor 390.

For sake of illustration, various embodiments of the present invention are described in connection with a transparent SMTP or ESMTP proxy; however, such examples are not intended to limit the scope of the present invention. Rather, the methodologies described herein have applicability to other current and future mail transfer protocols generally and applicability to scanning of digital certificates associated with files stored on computer-readable media separate and apart from the email context.

Figure 4:
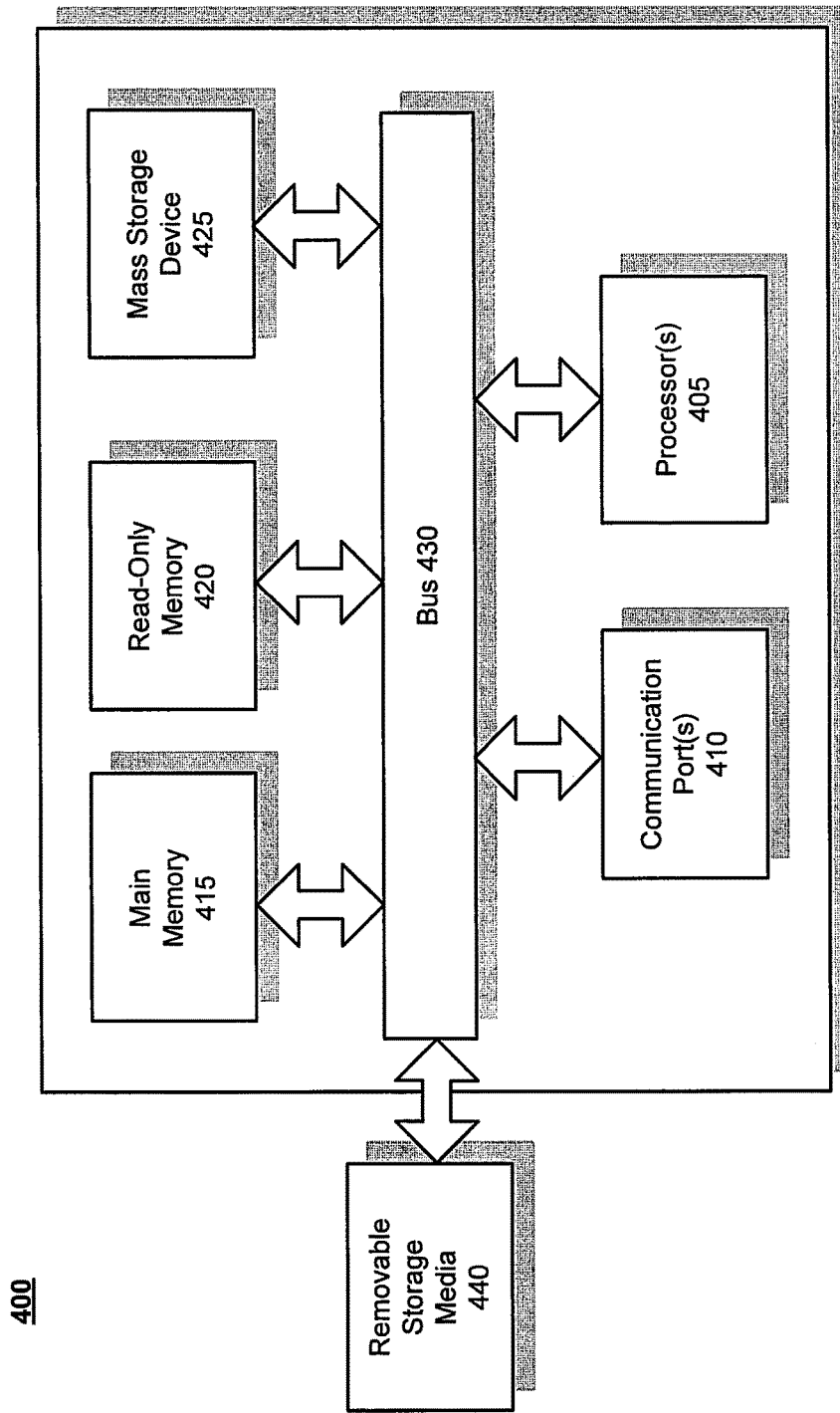
FIG. 4 is a block diagram conceptually illustrating one example of a simplified network architecture or computer system in which embodiments of the present invention may be employed and FIG. 5 is a flow diagram illustrating file scanning processing in accordance with an embodiment of the present invention.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 4 is an example of a computer system 400, such as a network security appliance, client, host computer or gateway device, upon which or with which embodiments of the present invention may be utilized.

According to the present example, the computer system includes a bus 430, at least one processor 405, at least one communication port 410, a main memory 415, a removable storage media 440 a read only memory 420, and a mass storage 425.

Processor(s) 405 can be any known processor, such as, but not limited to, an Intel® Itanium® or Itanium 2 processor(s), or AMD® Opteron® or Athlon MP® processor(s), or Motorola® lines of processors. Communication port(s) 410 can be any of an RS-232 port for use with a modem based dialup connection, a 10/100 Ethernet port, or a Gigabit port using copper or fiber. Communication port(s) 410 may be chosen depending on a network such a Local Area Network (LAN), Wide Area Network (WAN), or any network to which the computer system 400 connects.

Main memory 415 can be Random Access Memory (RAM), or any other dynamic storage device(s) commonly known in the art. Read only memory 420 can be any static storage device(s) such as Programmable Read Only Memory (PROM) chips for storing static information such as instructions for processor 405.

Mass storage 425 can be used to store information and instructions. For example, hard disks such as the Adaptec® family of SCSI drives, an optical disc, an array of disks such as RAID, such as the Adaptec family of RAID drives, or any other mass storage devices may be used.

Bus 430 communicatively couples processor(s) 405 with the other memory, storage and communication blocks. Bus 430 can be a PCI/PCI-X or SCSI based system bus depending on the storage devices used.

Optionally, operator and administrative interfaces 435, such as a display, keyboard, and a cursor control device, may also be coupled to bus 430 to support direct operator interaction with computer system 400. Other operator and administrative interfaces can be provided through network connections connected through communication ports 410.

Removable storage media 440 can be any kind of external hard-drives, for example, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Figure 5:
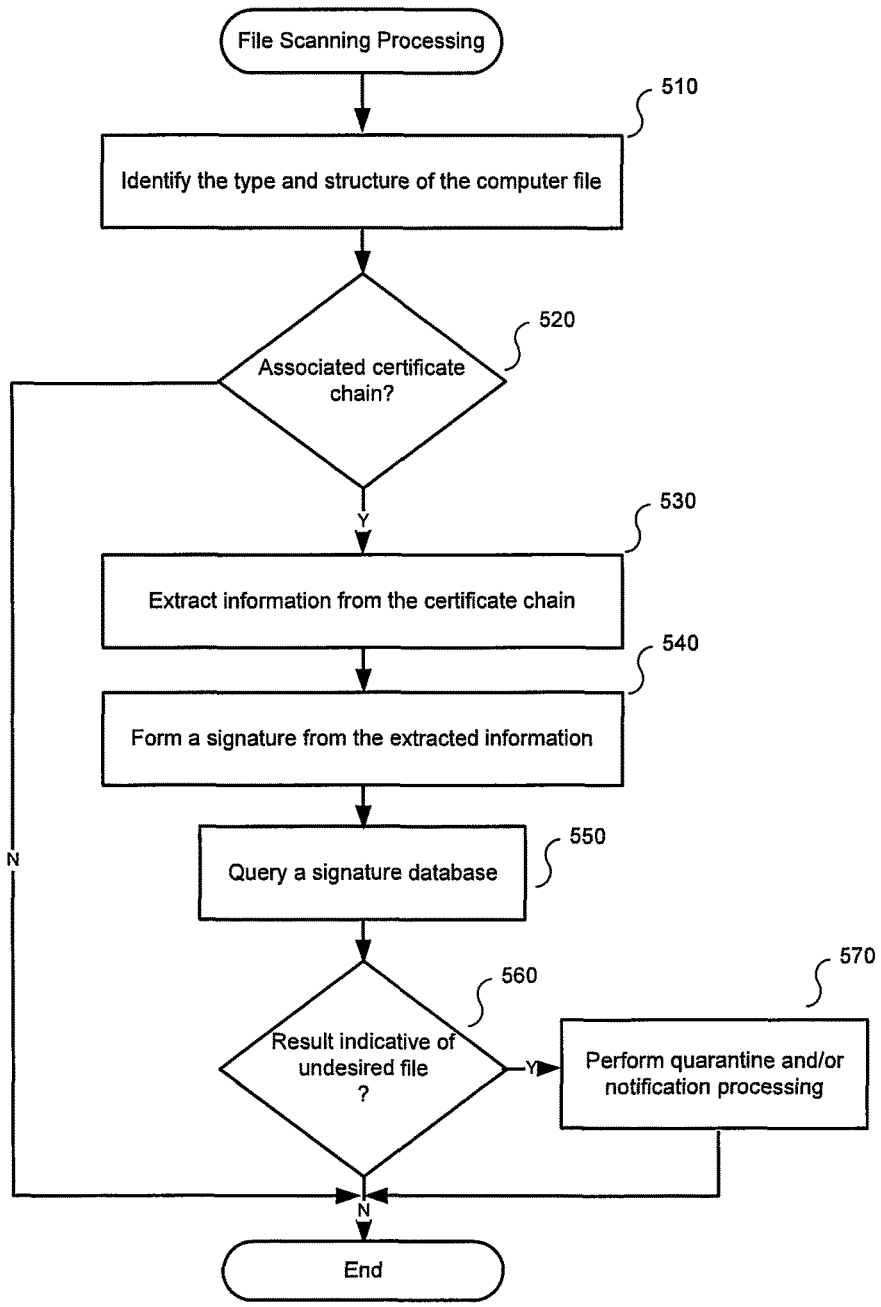

FIG. 5 is a flow diagram illustrating file scanning processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. In one embodiment, the processing described below is performed by an AV detection module, such as AV detection module 191, 291 or 391.

According to the present example, upon commencement of the file scanning processing, it has previously been determined that a file at issue, e.g., an automatically downloaded file, a proactively or manually downloaded file, an email attachment or the like, should be scanned. At block 510, the type and structure of the file at issue is identified. Each executable file format may have (i) its own specific mechanism used to identify itself as an executable of a particular format; or (ii) a particular usage model or format that while not intended to identify itself as a particular executable type, may still be used to ascertain the executable type. Relevant locations in the file at issue are checked for one or more primary identification bytes that would indicate the file at issue is a particular executable file format. These relevant locations may be locations containing codes intended to identify the archive type or they may be locations where identifiable data intended for some other purpose is stored. While, for convenience, the present example is described with reference to a Windows Portable Executable (PE) file format for executables, object code and dynamic link libraries (DLLs), it should be understood that other forms of executable files or data structures that encapsulate executable files may be processed in a similar manner.

At decision block 520, a determination is made regarding whether the file at issue has an associated certificate chain. In one embodiment, the file at issue is a Windows PE file and the determination can be made by checking the file header data directory to see if a certificate is present. In some instances, the certificate chain may be part of the file at issue and in other instances the certificate chain may be provided in a separate file. In any event, if an associated certificate chain is determined to exist, the processing continues with block 530; otherwise scanning is complete and processing branches to the end.

At block 530, information is extracted from the certificate chain. In one embodiment, only a subset of specific identification information is extracted. In other embodiments, the entire certificate chain may be extracted from the file at issue. For a Windows PE file, in one embodiment, a file offset specified in the data directory may be used to identify the location of the certificate chain header within the Windows PE file. Again, for purposes of illustration, various steps of the process may be described with reference to the Windows PE file format. However, use of the Windows PE file format as an example is not intended to limit the generality of the methodologies described herein.

At any rate, after locating the certificate chain header, the scanning process may then proceed to identify the start of the first certificate in the chain and loop through the certificates until the serial number of the end entity certificate is found. According to one embodiment, one or more of the following information/fields/flags are extracted from the end entity certificate: the subject country name field, the subject state/province name field, the subject organization name, the not before time, the not after time, the common name, the code signing flag, the time stamping flag, the client authority flag, the certificate authority flag and the alternate name field.

At block 540, a signature is formed based on the information extracted from the end entity certificate to allow the signature of the file at issue to be checked against a database of known undesired files. According to other embodiments, other characteristics of the certificate chain may also be used in the signature generation process, such as the length of the chain and the like.

At block 550, the signature of the file at issue is used to query a detection signature database. The detection signature database may be locally stored or cached. Alternatively, the query may be issued to a remote detection signature database. In one embodiment, undesired files may be indicated as a result of one or more of (i) the signature matching a detection signature in the detection signature database; (ii) lack of information in one or more of the subject country name field, the subject state/province field and the subject organization name field; (iii) matching of one or more of the subject organization name field, the common name field and the alternate name field against a list of companies known to be associated with undesired files; (iv) invalidity of the not before time field or the not after time field; and (v) status of various flag fields, such as the code signing flag, the time stamping flag, the client authority flag and the certificate authority flag.

At decision block 560, the result of the query is analyzed to determine if it is indicative of the file at issue being an undesired file. In various embodiment, the file at issue may be classified into one of multiple categories, e.g., known/ confirmed undesired file, known/confirmed clean file, unknown, suspected undesired file, etc, based on an evaluation of the signature of the file at issue and/or other characteristics of the certificate chain or information contained therein. If the result of the query is indicative of the file at issue being an undesired file, then processing branches to block 570; otherwise, file scanning processing is complete.

At block 570, responsive to determining the file at issue is an undesired file, various defensive actions may be undertaken. According to the present example, the file at issue may be quarantined and/or the end user or a system administrator may be notified. In alternative embodiments, policies for handling various file categorizations may be defined and the file at issue and/or the triggering event at issue may be handled in accordance with the corresponding policy. For example, if the file at issue is an email attachment, the email correspondence itself may be allowed to proceed after removing an undesired file attachment. The originator, system administrator and/or the recipient may further be notified of the defensive action taken and/or provided with general or specific information regarding the nature of the malware or undesired file detected. Furthermore, to facilitate geographic and/or statistical tracking of such events, the network device performing the file scanning may report the detection event to a central repository.

What is claimed is:

1. A method comprising:
   receiving, by an electronic mail (email) security system, logically interposed between an external network and a plurality of host systems within a private network an inbound email message;
   when the inbound email message includes an attachment, processing the attachment by an antivirus detection module running on the electronic mail (email) security system, including:
     identifying a type and structure of the attachment by examining relevant locations in the attachment for one or more primary identification bytes that are indicative of the attachment being of a particular executable file format;
     determining a location of the certificate chain with respect to the attachment based on the identified type and structure;
     forming a signature of the attachment by extracting a targeted subset of information from the certificate chain based on the type and structure of the attachment;
     evaluating the attachment by comparing the signature with a set signatures having a known desirable or undesirable status;
     classifying the attachment into a category of a plurality of categories based on a result of said evaluating; and
   when the category of the attachment is indicative of files associated therewith being malicious or being suspected of being malicious, a policy associated with the category causes the email security system to quarantine, block or otherwise attempt to prevent the attachment from being delivered to an end user of one of the plurality of host systems to which the inbound email message is addressed.

2. The method of claim 1, wherein the targeted subset of information includes the certificate chain in its entirety.

3. The method of claim 1, wherein the targeted subset of information comprises specific identification information from an end entity certificate of the certificate chain.

4. The method of claim 3, wherein the targeted subset of information includes all or part of one or more of: a certificate serial number of the end entity certificate, an issuer name of the end entity certificate, validity information associated with the end entity certificate, a subject name of the end entity certificate, an alternate name from the end entity certificate and key usage information associated with the end entity certificate.

5. The method of claim 1, wherein the certificate chain is located at an end of the attachment.

6. The method of claim 1, wherein the certificate chain is located within a separate file from the attachment.

7. The method of claim 1, wherein the identified type comprises a file format for encapsulating one or more of executables, object code and dynamic-link libraries (DLLs).

8. The method of claim 7, wherein the attachment comprises a Portable Executable file.

9. The method of claim 1, wherein the attachment comprises an archive file.

10. The method of claim 1, wherein a mail transfer protocol proxy running on the email security system causes the attachment to be subjected to the processing performed by the antivirus detection module.

11. A non-transitory program storage device readable by an electronic mail (email) security system logically interposed between an external network and a plurality of host systems within a private network, embodying a program of instructions executable by one or more processors of the email security system to perform a method comprising:
receiving an inbound email message;
when the inbound email message includes an attachment,
processing the attachment by an antivirus detection module running on the electronic mail (email) security system, including:
identifying a type and structure of the attachment by examining relevant locations in the attachment for one or more primary identification bytes that are indicative of the attachment being of a particular executable file format;
determining a location of the certificate chain with respect to the attachment based on the identified type and structure;
forming a signature of the attachment by extracting a targeted subset of information from the certificate chain based on the type and structure of the attachment;
evaluating the attachment by comparing the signature with a set signatures having a known desirable or undesirable status;
classifying the attachment into a category of a plurality of categories based on a result of said evaluating; and
when the category of the attachment is indicative of files associated therewith being malicious or being suspected of being malicious, a policy associated with the category causes the email security system to quarantine, block or otherwise attempt to prevent the attachment from being delivered to an end user of one of the plurality of host systems to which the inbound email message is addressed.

12. The non-transitory program storage device of claim 11, wherein the targeted subset of information includes the certificate chain in its entirety.

13. The non-transitory program storage device of claim 11, wherein the targeted subset of information comprises specific identification information from an end entity certificate of the certificate chain.

14. The non-transitory program storage device of claim 13, wherein the targeted subset of information includes all or part of one or more of: a certificate serial number of the end entity certificate, an issuer name of the end entity certificate, validity information associated with the end entity certificate, a subject name of the end entity certificate, an alternate name from the end entity certificate and key usage information associated with the end entity certificate.

15. The non-transitory program storage device of claim 11, wherein the certificate chain is located at an end of the attachment.

16. The non-transitory program storage device of claim 11, wherein the certificate chain is located within a separate file from the attachment.

17. The non-transitory program storage device of claim 11, wherein the identified type comprises a file format for encapsulating one or more of executables, object code and dynamic-link libraries (DLLs).

18. The non-transitory program storage device of claim 17, wherein the attachment comprises a Portable Executable file.

19. The non-transitory program storage device of claim 11, wherein the attachment comprises an archive file.

20. The non-transitory program storage device of claim 11, wherein a mail transfer protocol proxy running on the email security system causes the attachment to be subjected to the processing performed by the antivirus detection module.

* * * * *